United States Patent [19]
Silvent et al.

[11] Patent Number: 5,825,358
[45] Date of Patent: Oct. 20, 1998

[54] PROCESS AND SYSTEM FOR FORMING MULTIPLE PREEMPTIVE MODELESS DIALOG BOXES

[75] Inventors: Therese M. Silvent, Phoenix; Valentine W. Golec, Glendale; James T. Godziela, Phoenix, all of Ariz.

[73] Assignee: Honeywell, Inc., Minneapolis, Minn.

[21] Appl. No.: 725,774

[22] Filed: Oct. 4, 1996

[51] Int. Cl.[6] ...................................................... G06F 3/00
[52] U.S. Cl. ........................................... 345/340; 345/346
[58] Field of Search ..................................... 345/347, 340, 345/339, 975, 326, 346; 395/677, 678, 680, 683

[56] References Cited

U.S. PATENT DOCUMENTS

| | | | |
|---|---|---|---|
| 5,414,810 | 5/1995 | Doyle et al. | 345/346 |
| 5,546,525 | 8/1996 | Wolf et al. | 345/346 |
| 5,583,982 | 12/1996 | Matheny et al. | 345/326 |
| 5,613,058 | 3/1997 | Koppolu et al. | 345/326 |
| 5,675,520 | 10/1997 | Pitt, III et al. | 364/578 |

FOREIGN PATENT DOCUMENTS

0 463 250 A1  1/1992  European Pat. Off. .

*Primary Examiner*—Matthew M. Kim
*Assistant Examiner*—Crescelle N. dela Torre
*Attorney, Agent, or Firm*—Ohlandt, Greeley, Ruggiero & Perle

[57] ABSTRACT

A process and system for (a) minimizing operator interaction for selecting various functions of an application using a main window thread, an intelligent worker thread and a preemptive modeless dialog box; and (b) minimizing display clutter. The intelligent worker thread is capable of reading messages sent from a designated Window function requesting the creation of a preemptive modeless dialog box, determining whether any previous preemptive modeless dialog box is active, deleting any previous preemptive modeless dialog box and creating a subsequent preemptive modeless dialog box requested by the message sent from the designated Window function, and dispatching foreign keypushes back to the main window thread.

23 Claims, 6 Drawing Sheets

PROCESS AND SYSTEM FOR FORMING MULTIPLE PREEMPTIVE MODELESS DIALOG BOXES

The present invention relates generally to systems having windows-based user interfaces for smooth interaction with their respective operators. More particularly, the present invention relates to a process for running a windows-based application that includes user-interactive preemptive modeless dialog boxes for performing specific functions for an application.

BACKGROUND OF THE INVENTION

A Windows® (a registered trademark of the Microsoft Corporation) based system, such as a computer system running Microsoft Windows NT® (a registered trademark of the Microsoft Corporation), provides a convenient user interface for smooth interaction between a computer operator and the computer system. Such user interface typically provides an application with a small window, namely a dialog box, that is brought to the forefront of the application to solicit a response from the operator. Once the response is received, the dialog box is removed from view and the operation of the application continues.

Standard software libraries, such as the Microsoft Foundation Class ("MFC") library, provide standard routines for implementing and developing dialog boxes for any specific application and are readily available for use by application engineers. The MFC library, in particular, includes software routines for developing Modal Dialog Boxes and Modeless Dialog Boxes in computer applications. The Modal Dialog Box runs on the main thread of program execution and requires user input before further processing can continue. In contrast, each Modeless Dialog Box runs on a separate thread of execution and, thus, can exist in parallel with other processes.

Standard software libraries provide an easy way to implement and develop dialog boxes for software applications, but existing implementations of dialog boxes can be cumbersome to use. The use of such cumbersome dialog boxes can be troubling for many computer operators, particularly for those who must use their computers quickly and efficiently. For example, operators of plants or refineries use sophisticated applications running on computer networks to monitor and maintain day-to-day operations of such facilities. Since the computer network operates as a real-time database, the operator's interaction with a particular computer must be quick and responsive and should not be hindered by a cumbersome or cluttered user interface. In addition, an operator may mistakenly select an unwanted function or change his or her mind about selecting a particular function and pull-up its corresponding dialog box.

Unfortunately, existing implementations of dialog boxes require extra inputs, i.e., keystrokes or mouse clicks, in order to select a different function and a corresponding new dialog box. For example, the Modal Dialog Box implemented by the MFC library requires that the operator cancel the previous selection before selecting a new function. For the Modeless Dialog Box, the operator must select the area outside of the dialog box's outer boundary before another selection may be made. Also, a Modeless Dialog Box is created for each selection and, thus, the display becomes crowded and blocks the operator's view of essential information.

Figures 1, 2:
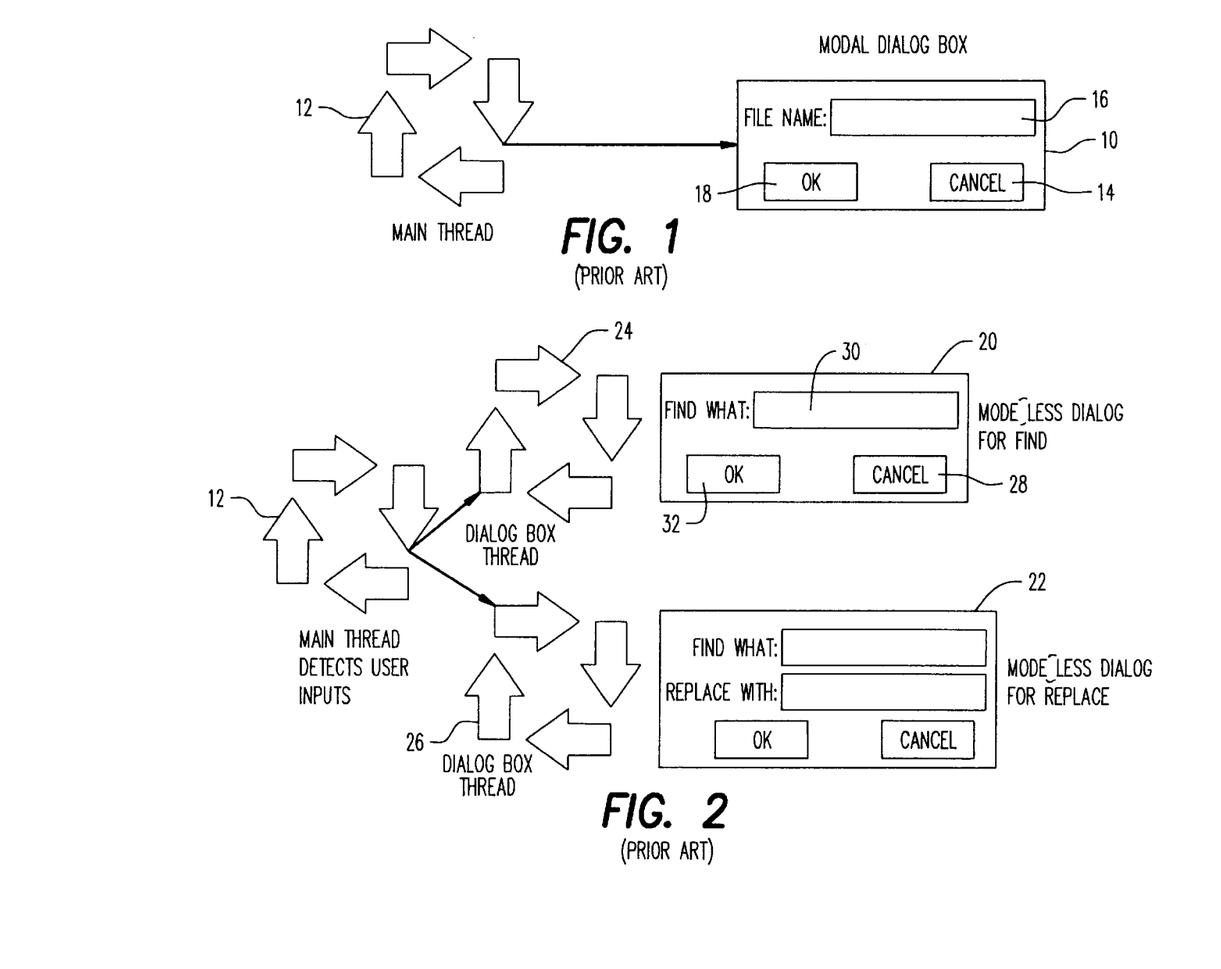
FIG. 1 is a representational view of a modal dialog box of the prior art.
FIG. 2 is a representational view of a pair of modeless dialog boxes of the prior art.

Dialog boxes of the prior art are shown in FIGS. 1 and 2. In particular, FIG. 1 shows a modal dialog box 10 that is implemented by the MFC library of the prior art. Modal dialog box 10 runs on a main thread 12 of the current application. Once modal dialog box 10 is called up in front of the application, input must be provided by an operator to the system before further processing can continue. For example, modal dialog box 10 shown in FIG. 1 is a dialog box for a typical word processing program for saving a current file under a particular file name. Accordingly, the operator must either select "Cancel" button 14 or provide a file name in "File Name" field 16 and select "OK" button 18 before operation of the application may continue.

FIG. 2 shows modeless dialog boxes (20,22) that, like modal dialog box 10 shown in FIG. 1, are implemented by the MFC library of the prior art. Each modeless dialog box (20,22) runs on a separate thread (24,26) of execution and, thus, other processing can continue in parallel with the existence of one or more modeless dialog boxes. However, the utilization of separate threads (24,26) requires the system to provide extra resources to the current application and, since resources are limited, this requirement for separate threads may hinder the performance of the system.

In addition, selection of a new function before responding to a previously selected function requires that the operator access the main window of the application. For example, referring to FIG. 2, modeless dialog boxes (20,22) are used for a typical word processing program and appear when the operator requests a find function and a replace function, respectively. When an operator requests the find function, modeless dialog box 20 will appear at the forefront of the system and have the view (i.e., its border will be bold colored). At this point, the box is ready to receive inputs, and the operator may either select the "Cancel" button 28 or provide a phrase or phrases to be found in "Find What" field 30 and select the "OK" button 32. Any other input provided when modeless dialog box 20 has the view will be ignored. Accordingly, if the operator wishes to request a replace function without responding to the find function, the operator must access the main window of the application. This is typically done by clicking in some area of the main window to return it to view. After accessing the main window, the operator may then request the replace function from the main window's menu so the modeless dialog box 22 will appear at the forefront of the system and have the view. It is to be understood that both the FIND and REPLACE boxes co-exist, but the FIND box will only accept inputs when it is given the view by the mouse click, and only the REPLACE box will accept inputs when it has the view.

The present invention pertains to a process for creating preemptive modeless dialog boxes that reduce the inputs, i.e., keystrokes or mouse clicks, required to control a particular application function and allows a user to select a new function without having to access the main window. In particular, the preemptive modeless dialog box receives all events as though it was the main window of the application. Thus, it is not necessary to return to the main window in order to call a new function. A preemptive modeless dialog box is capable of processing its own inputs, as well as interpreting requests for new functions. The latter characteristic makes it preemptive. A previously selected function may be preempted when a request for a new function is passed through the preemptive modeless dialog box. In response to the new request, the current preemptive modeless dialog box is deleted, and the type of preemptive modeless dialog box corresponding to the new function is created in its place. The preemptive modeless dialog box (PMDB) according to the present invention has two main advantages over conventional modal or modeless dialog boxes: (1) it minimizes user inputs; and (2) it simplifies the display (i.e., keeps it uncluttered). Accordingly, the present invention provides a simpler and faster user interface for interacting with a dialog box.

SUMMARY OF THE INVENTION

The present invention is a process for minimizing operator interaction for selecting various functions of an application running on a system. In particular, it is directed to a process and system for managing multiple preemptive modeless dialog boxes by means of a novel intelligent worker thread (IWT) disposed between a main window thread (MWT) and at least one dialog box thread (DBT). This, in turn, enables an operator to select various functions of an application without having to return to the application's main window. This is accomplished through use of the intelligent worker thread which acts on behalf of the preemptive modeless dialog box to dispatch its inputs, as well as foreign keypushes. This results in ease of use for the operator, and an uncluttered display. The intelligent worker thread ensures that only one preemptive modeless dialog box, i.e., the preemptive modeless dialog box (PMDB) of current interest to the user, is on the display at any given point in time.

The main window thread comprises the steps of creating the intelligent worker thread; checking the message queue of the main window thread for any messages; terminating the main window thread if message is "QUIT"; and sending messages to a designated and/or Window function (also referred to as a Window procedure) for processing. The main window thread further comprises the steps of activating the designated Window function and then via the Window function; determining whether a preemptive modeless dialog box is needed; and sending a message to the message queue of the intelligent worker thread to create a preemptive modeless dialog box for a designated function.

Certain Windows® software provides functions that the user can customize to enable his or her application to handle a Windows message. For example, a Windows message generated in response to a depression of a keyboard key is dispatched by the main window thread to a specific Window function which will handle this event. The user can customize the implementation of these functions according to his or her needs. Throughout the remainder of this application, these Microsoft® (a registered trademark of the Microsoft Corporation) functions which are user-taylorable will be referred to as Window functions.

If the user requires a preemptive modeless dialog box to handle one of his or her incoming events, the user would customize the implementation of the appropriate Window function to send a WM_PMDB message to the intelligent worker thread, specifying the type of preemptive modeless dialog box desired.

The intelligent worker thread comprises the steps of checking the message queue of the intelligent worker thread for any messages; managing the creation and deletion of preemptive modeless dialog boxes for WM_PMDB messages (i.e., messages initiated by users in the windows application), dispatching foreign keypushes back to the parent thread (e.g., in the present invention this parent thread is referred to as the main window thread), and forwarding dialog box inputs to the dialog box thread. It further comprises the step of terminating the intelligent worker thread if message is "QUIT".

The preemptive modeless dialog box's inputs are processed by a separate thread of control (hereinafter referred to as dialog box thread). This dedicated dialog box thread is managed exclusively by the Window's software.

The present invention is also directed to a storage media used to control a processor capable of managing multiple preemptive modeless dialog boxes. This, in turn, enables an operator to select various functions of an application without having to return to the application's main window. The storage media comprises: a means for creating a main window thread which controls the functions; a means for creating a preemptive modeless dialog box object which comprises an intelligent worker thread which is in communication with both the main window thread and the dialog box thread; a means for creating an active preemptive modeless dialog box corresponding to a first function of the application; and a means for creating at least one subsequent preemptive modeless dialog box corresponding to a second function of the application; wherein the active preemptive modeless dialog box is terminated by the intelligent worker thread whenever a subsequent preemptive modeless dialog box is created such that the subsequent preemptive modeless dialog box then becomes the active preemptive modeless dialog box.

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

The present invention is a process and system that uses preemptive modeless dialog boxes to reduce the number of inputs, such as keystrokes or mouse clicks, that are required to control a particular function or process and to simplify the display. It maintains only the preemptive modeless dialog box of current interest to the user on the display. The process may be used on any type of computer system or computer network having sufficient processing power and memory to run a windows-based operating system, such as Microsoft Windows NT®. Examples of such systems include, but are not limited to, personal computers or workstations having CISC or RISC type microprocessors. If an operator selects the wrong function or otherwise decides to select a different function, a new selection can be made without having to access the main window. The preemptive modeless dialog box receives all events in the same manner as the main window of the current application. By allowing all events to pass through the preemptive modeless dialog box, the moments to override the previous function selection can be determined.

Figure 3:
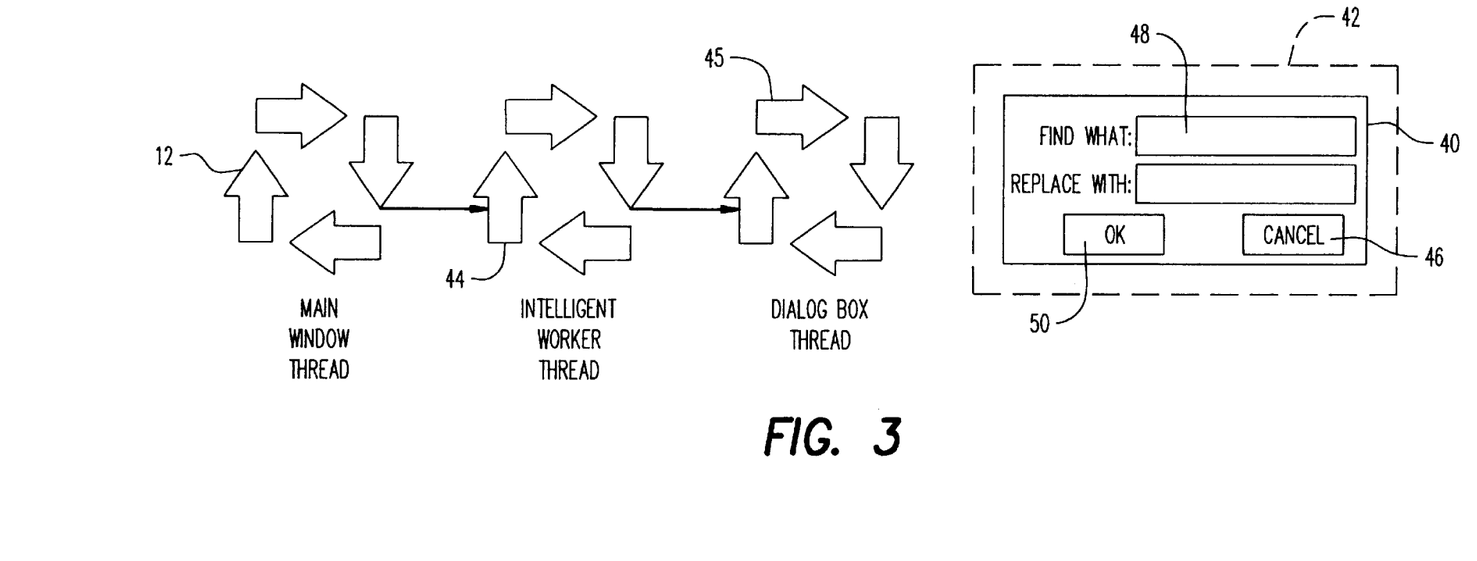
FIG. 3 is a representational view of the preferred preemptive modeless dialog boxes in accordance with the present invention.

Referring to FIG. 3, there is provided preemptive modeless dialog boxes of the preferred embodiment that are generally represented by reference numerals (40,42). Preemptive modeless dialog boxes (40,42) include all functionality of modeless dialog boxes (20,22) shown in FIG. 2. However, in contrast to modeless dialog boxes (20,22), preemptive modeless dialog boxes (40,42) use a single box to handle user inputs for multiple functions and, thus, save on resources of the system. In particular, preemptive modeless dialog boxes (40,42) recognize and process foreign inputs as well as inputs directed to its own function. Such foreign inputs include any inputs that are recognizable by the main window of the application, such as requests for various functions which may also require a preemptive modeless dialog box.

FIG. 3 also shows the transition from preemptive modeless dialog box 40 to preemptive modeless dialog box 42. The intelligent worker thread ("IWT") 44 for the preemptive modeless dialog boxes (40,42), which is a thread created by the main window thread ("MWT") 12 of the application, detects user inputs, manages the creation of new dialog boxes and the deletion of old dialog boxes via dialog box thread 45. The MWT is created and managed transparently by Windows when the main application window is created. As part of application initialization, the MWT creates a preemptive modeless dialog box object. A side-effect of creating this preemptive modeless dialog box object is the creation of the intelligent worker thread. Therefore, the selection of a new function before responding to a previously selected function does not require access to the main window of the application. For example, referring to FIG. 3, preemptive modeless dialog boxes (40,42) are used for a typical word processing program and appear when the operator requests either the FIND function and the REPLACE function, respectively. When an operator requests the FIND function, preemptive modeless dialog box 40 will appear at the forefront of the system. The operator may then select the "Cancel" button 46 or provide a phrase or phrases to be found in "Find What" field 48 and select the "OK" button 50. In contrast to modeless dialog box 20 shown in FIG. 2, preemptive modeless dialog box 40 can also respond to foreign inputs that relate to other functions. Therefore, if the operator wishes to request a replace function without responding to the find function, the operator may simply request the replace function so the preemptive modeless dialog box 42 for the replace function will appear at the forefront of the system. In doing so, the previous preemptive modeless dialog box 40 for the find function, together with its respective dialog box thread 45, will disappear, and the new preemptive modeless dialog box 42 for the replace function, together with its respective dialog box thread 45, will appear automatically. Thus, de-selection of the dialog box is not required to request a new function.

Figure 4:
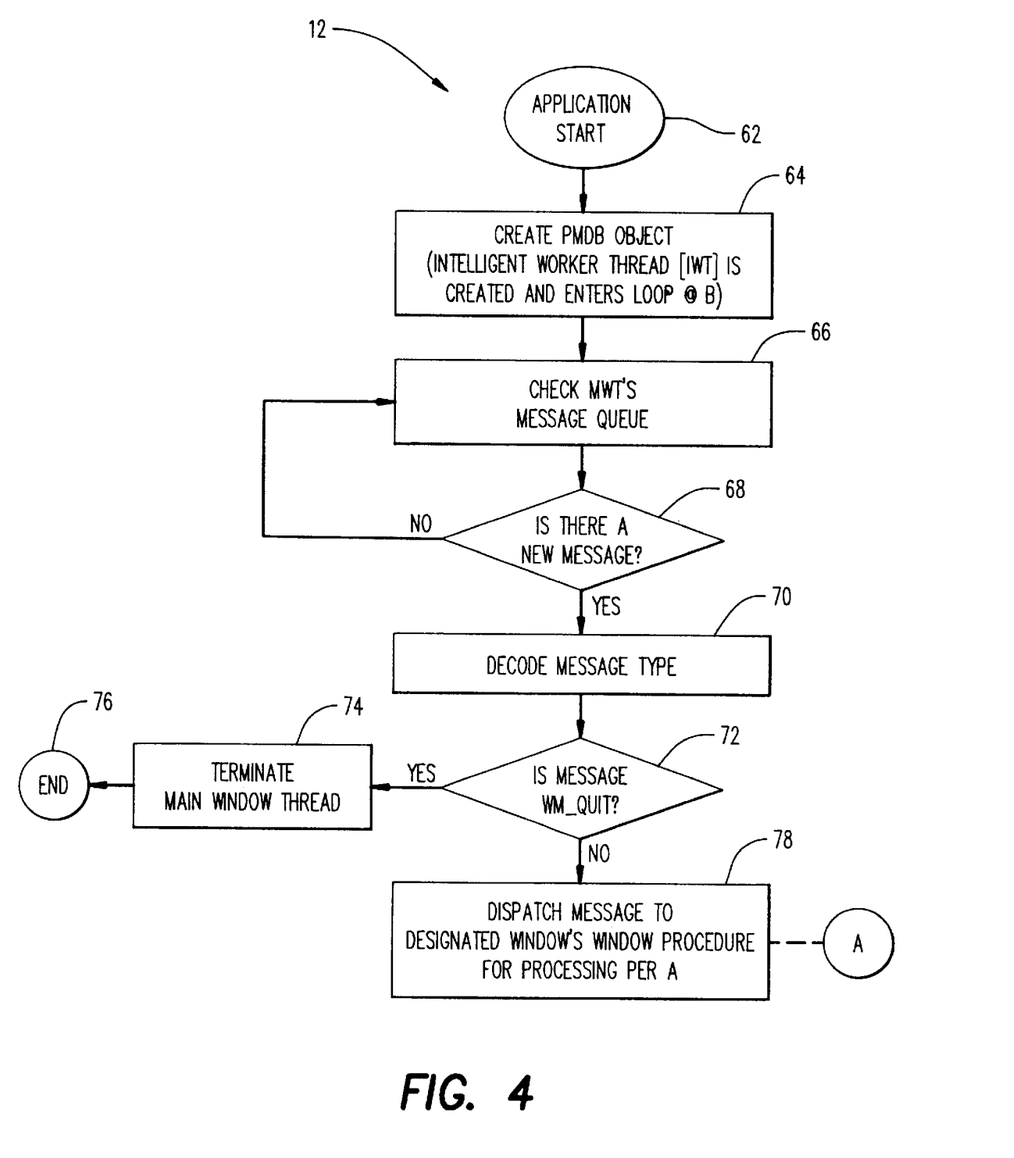
FIG. 4 is a flow diagram of the main window thread in accordance with the present invention.

Referring to FIG. 4, there is shown main window thread ("MWT") 12 of the present invention. As part of application initialization as shown in step 64, the application creates a preemptive modeless dialog box object ("PMDB object") and intelligent worker thread ("IWT") 44 (i.e., IWT 44 is created and enters thread loop at "B" as described in FIG. 6 below), and the PMDB object starts running the thread loop procedure of its window thread which is the intelligent worker thread, as described below for FIG. 6. The system continues to check the MWT's message queue until a new message is received as shown in steps 66 and 68. When a new message is received, the message type is decoded as shown in step 70. The system reads the message to determine whether the MWT should be terminated as shown in step 72. If so, the operation of the MWT is terminated as shown in steps 74 and 76. If the message does not indicate that the MWT should be terminated, the system dispatches the message to a designated Window function for processing as shown in step 78 as will be discussed further in FIG. 5 below.

Figure 5:
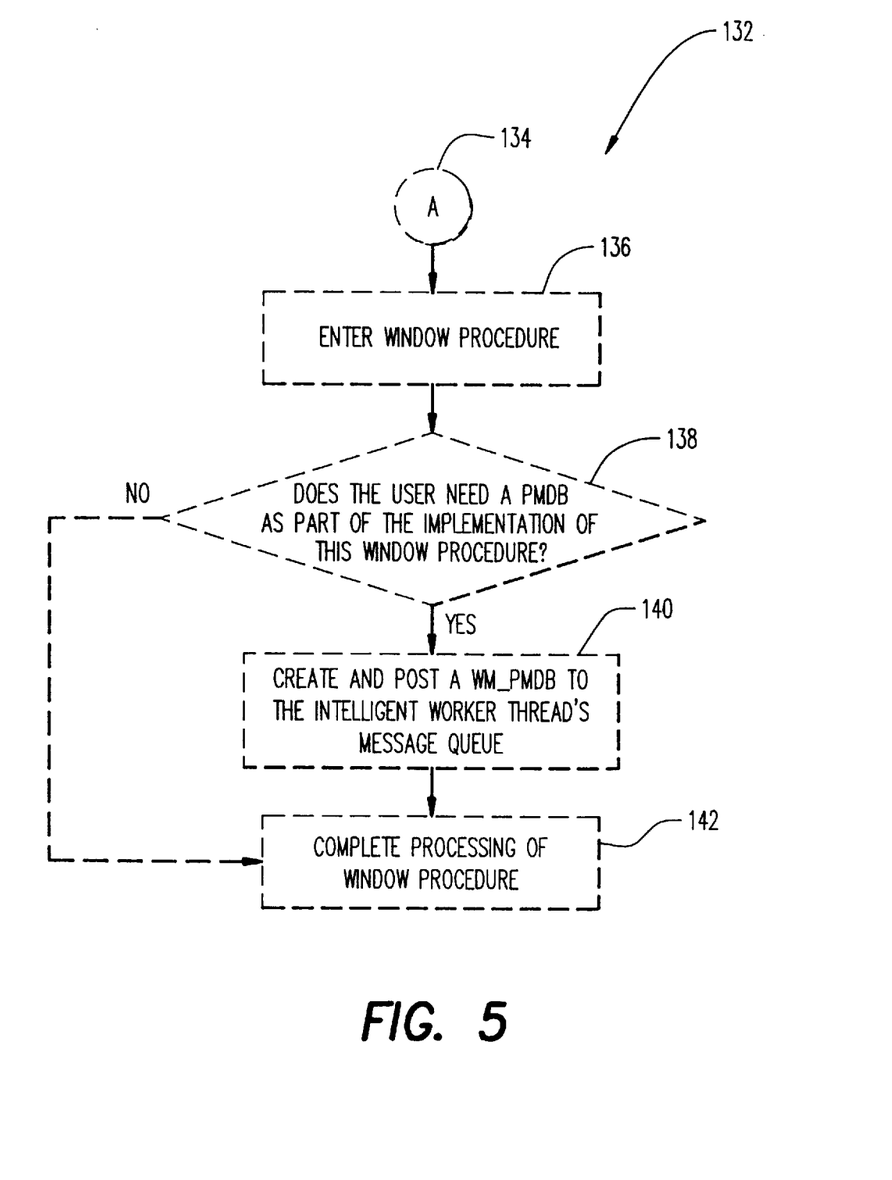
FIG. 5 is a flow diagram of the generic Window function of FIG. 4.
Figure 7:
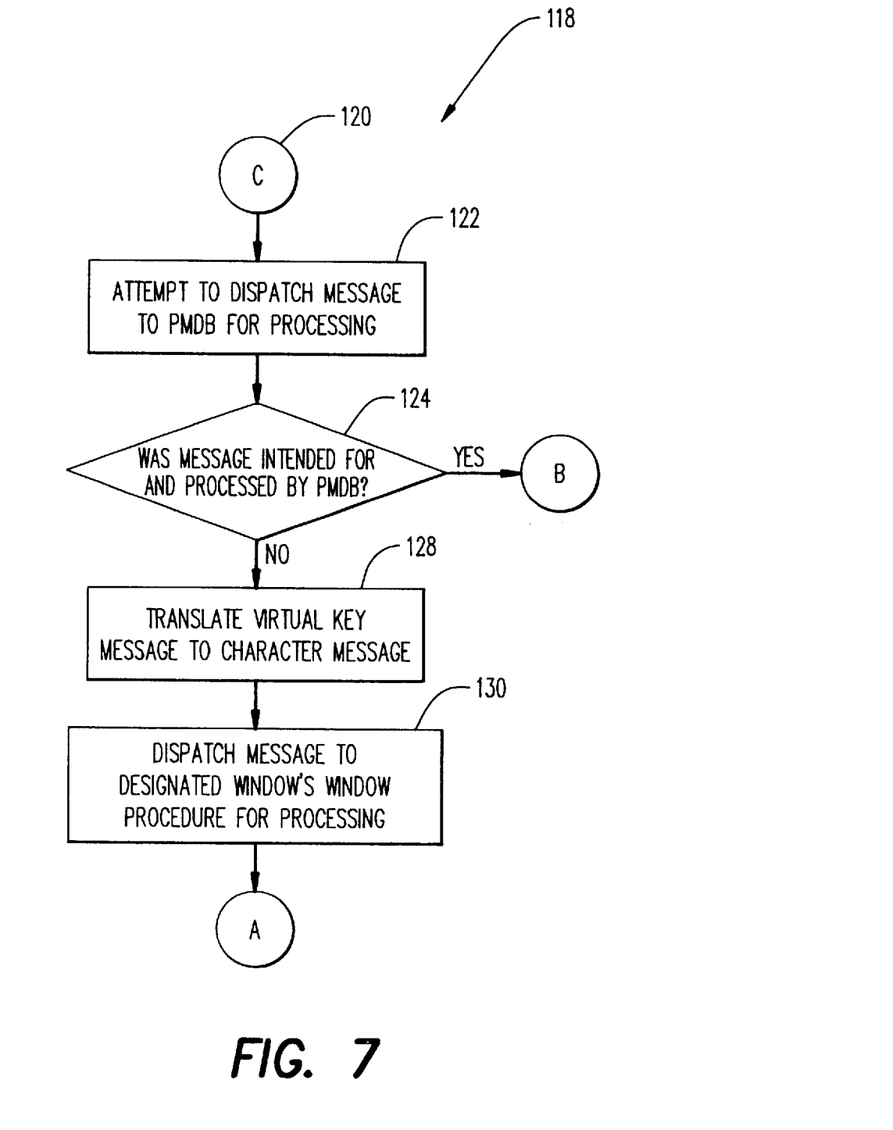
FIG. 7 is a continuation of FIG. 6.

Referring to FIG. 5, there is shown a generic Window function "A" of the present invention that follows the dispatch of the messages indicated in FIGS. 4 and 7. The Window function is entered as shown in step 136 and, then the system determines whether the user needs a PMDB as part of the implementation of the Window function as shown in step 138. If so, a PMDB message is created and posted to the IWT's message queue as shown in step 140 and the processing of the Window function is completed as shown in step 142. If the user does not need a PMDB as part of the implementation of the Window function, then the system simply completes the processing of the Window function. Every modeless dialog box has a separate dialog box thread. As such, a preemptive modeless dialog box has a dialog box thread. This dialog box thread is created inherently by the Windows's software when the modeless dialog box is created. It is the existence of this separate or dedicated dialog box thread that distinguishes a modeless dialog box from a modal dialog box. This dialog box thread receives and processes the inputs for a specific modeless dialog box (e.g., OK, CANCEL, ASCII character sequences for Edit Control), and can be contrasted to the intelligent worker thread, whose main purpose is to manage preemptive modeless dialog boxes (i.e, creation, deletion, message dispatching, etc.).

Figure 6:
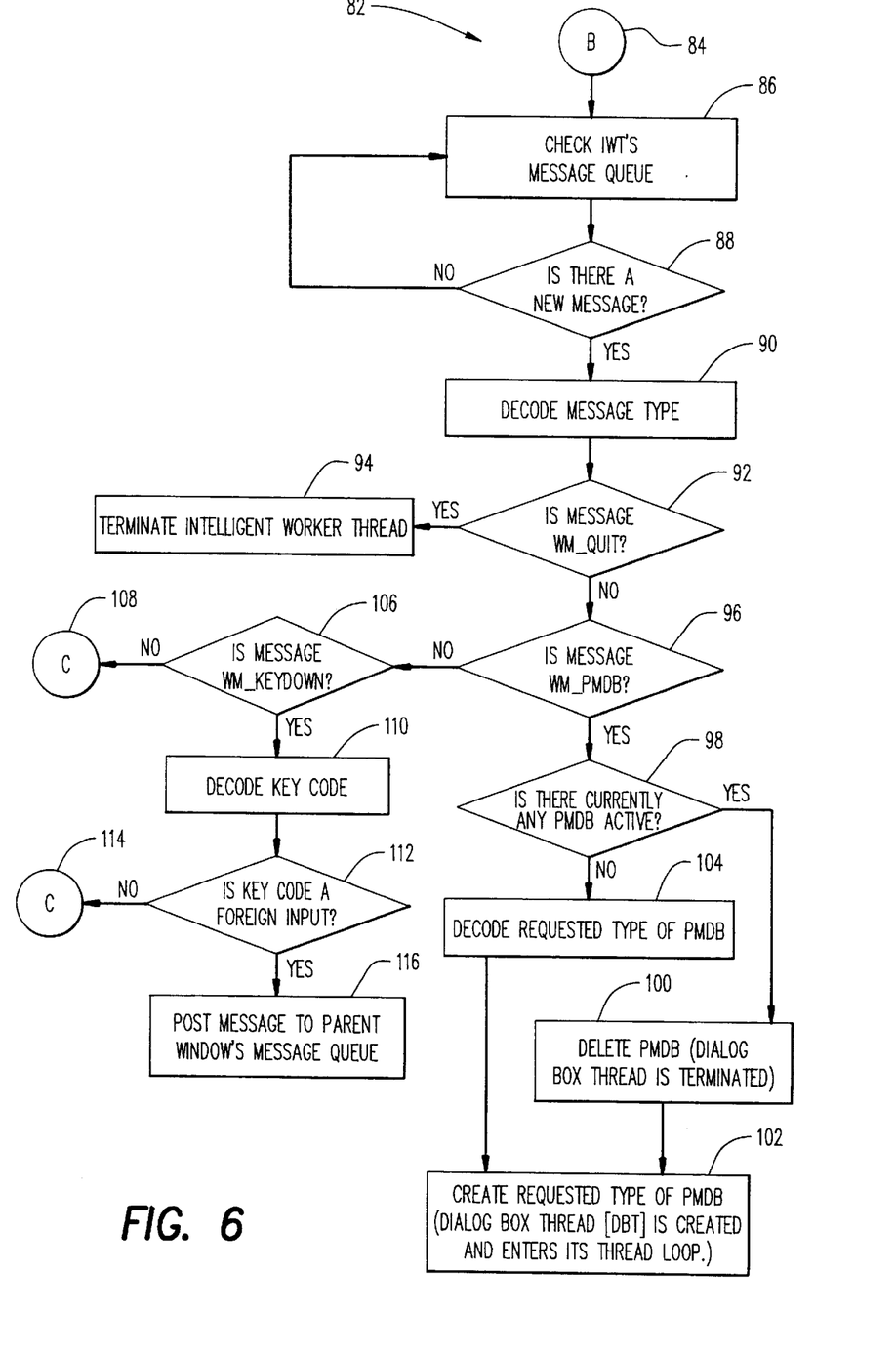
FIG. 6 is a flow diagram of the first intelligent worker thread of FIG. 4.

FIG. 6 depicts loop procedure B for the PMDB object's intelligent worker thread ("IWT") 44. The system continually checks the IWT's message queue until a new message is received as shown in steps 86 and 88, which originated in a Windows function (also referred to as a Windows procedure) (e.g., 140). The message type is decoded as shown in step 90, and the system determines whether the IWT should be terminated as shown in step 92. If so, the operation of the IWT is terminated as shown in step 94. Otherwise, the systems goes on to determine whether the message is a new PMDB type message as shown in step 96. If a PMDB type message is detected, the system deletes any active PMDB (i.e., the active dialog box thread (DBT)) as shown in steps 98 and 100 and creates the newly requested type of PMDB.

When the new PMDB is created, a new dialog box thread 45 is created, and enters its thread loop as shown in step 102. Note that the dialog box thread's loop is not discussed herein because it is completely managed by the Windows software as known to one of ordinary skill in the art, transparent to the user. If an active PMDB is not detected, then the system simply decodes the requested type of PMDB as shown in step 104 before creating the requested type of PMDB and enters its thread loop 45.

Referring again to step 96 of FIG. 6, if a PMDB type message is not detected, then the system determines whether the message is a key input or its equivalent as shown in step 106. If so, the system decodes the keycode as shown in step 110, and determines whether the keycode is a foreign input as shown in step 112. If the message is not a key input (or equivalent) or is not a foreign input, then the message is translated and dispatched to the PMDB's dialog box thread 45 for potential processing according to procedure "C" as described below in FIG. 7. Examples of typical keycodes destined for dialog box thread 45 for processing include ASCII characters for an edit control associated with the PMB, an "OK" input, a "CANCEL" input or a return character. If the message is a foreign input, e.g., a request for a new function not serviced by this particular type of preemptive modeless dialog box, then the system posts the message to the parent window's message queue as shown in step 116. Note that the parent dispatches the message to the designated Windows function, which may, in turn, require a new and different preemptive modeless dialog box for its implementation. This request would then go to the intelligent worker thread, and so the cycle continues.

Referring to FIG. 7, there is provided the procedure "C" for translating and dispatching the message to the PMDB's thread 45 for potential processing. In particular, the system attempts to dispatch the message to the PMDB for processing as shown in step 122. The system then determines whether the message was intended for and processed by the PMDB thread 45 as shown in step 124. If so, processing of the message has already occurred by the dialog box thread 45 at a previous step and the processing is returned to procedure "B". Otherwise, the virtual key message is translated to a character message as shown in step 128, and the message is dispatched to the designated Window function "A" for processing as shown in step 130.

The invention having been thus described with particular reference to the preferred embodiments thereof, it will be obvious that various changes and modifications may be made therein without departing from the spirit and scope of the invention as defined in the appended claims.

What is claimed is:

1. A process for managing multiple preemptive modeless dialog boxes which enables an operator to select various functions of an application without having to de-select a previous function of said application, said application having a main window thread which controls said functions, the process comprising the steps of:

creating a preemptive modeless dialog box object which comprises an intelligent worker thread which is in communication with both said main window thread and a dialog box thread;

creating an active preemptive modeless dialog box corresponding to a first function of said application; and creating at least one subsequent preemptive modeless dialog box corresponding to a second function of said application;

wherein said active preemptive modeless dialog box is terminated by said intelligent worker thread whenever a subsequent preemptive modeless dialog box is created such that said subsequent preemptive modeless dialog box then becomes the active preemptive modeless dialog box.

2. The process according to claim 1 wherein each said active and/or subsequent preemptive modeless dialog box is managed by said intelligent worker thread, and its inputs are processed by its respective dialog box thread.

3. The process according to claim 1 wherein said intelligent worker thread acts on behalf of said active preemptive modeless dialog box to dispatch its inputs, as well as foreign keypushes.

4. The process according to claim 1 wherein said intelligent worker thread comprises the steps of:

checking the message queue of said intelligent worker thread for any messages;

determining if said active preemptive modeless dialog box is requested from said messages;

deleting said active preemptive modeless dialog box if it exists; and creating said subsequent preemptive modeless dialog box.

5. The process according to claim 4 further comprising the step of:

posting messages from said intelligent worker thread to said main windows thread.

6. The process according to claim 4 further comprising the step of terminating said intelligent worker thread if said message is "QUIT".

7. The process according to claim 1 wherein said main window thread determines via a Window function whether a preemptive modeless dialog box is needed in accordance with inputs from said operator; and sends a message to said intelligent worker thread to create a preemptive modeless dialog box for a designated function.

8. A system capable of managing multiple preemptive modeless dialog boxes which enables an operator to select various functions of an application without having to de-select a previous function of said application, said system comprising:

a main window thread which is capable of controlling said functions of said application;

a means for creating a preemptive modeless dialog box object which comprises an intelligent worker thread which is in communication with both said main window thread and a dialog box thread;

a means for creating an active preemptive modeless dialog box corresponding to a first function of said application; and a means for creating at least one subsequent preemptive modeless dialog box corresponding to a second function of said application;

wherein said active preemptive modeless dialog box is terminated by said intelligent worker thread whenever a subsequent preemptive modeless dialog box is created such that said subsequent preemptive modeless dialog box then becomes the active preemptive modeless dialog box.

9. The system according to claim 8 wherein each said active and/or subsequent preemptive modeless dialog box is managed by said intelligent worker thread, and its inputs are processed by its respective dialog box thread.

10. The system according to claim 8 wherein said intelligent worker thread acts on behalf of said active preemptive modeless dialog box to dispatch its inputs, as well as foreign keypushes.

11. The system according to claim 8 wherein said intelligent worker thread comprises:

a means for checking the message queue of said intelligent worker thread for any messages;

a means for determining if said active preemptive modeless dialog box is requested from said messages;

a means for deleting said active preemptive modeless dialog box if it exists; and a means for creating said subsequent preemptive modeless dialog box.

12. The system according to claim 11 further comprising:

a means for posting messages from said intelligent worker thread to said main windows thread.

13. The system according to claim 11 further comprising a means for terminating said intelligent worker thread if message is "QUIT".

14. The system according to claim 11 further comprising a means for terminating said main window thread if message is "QUIT".

15. The system according to claim 8 wherein said main window thread determines via a Window function whether a preemptive modeless dialog box is needed in accordance with inputs from said operator; and sends a message to said intelligent worker thread to create a preemptive modeless dialog box for a designated function.

16. A storage media for controlling a processor so as to manage multiple preemptive modeless dialog boxes which enables an operator to select various functions of an application without having to de-select a previous function of said application, said storage media comprising:

a main window thread which is capable of controlling said functions of said application;

a means for creating a preemptive modeless dialog box object which comprises an intelligent worker thread which is in communication with both said main window thread and a dialog box thread;

a means for creating an active preemptive modeless dialog box corresponding to a first function of said application; and a means for creating at least one subsequent preemptive modeless dialog box corresponding to a second function of said application;

wherein said active preemptive modeless dialog box is terminated by said intelligent worker thread whenever a subsequent preemptive modeless dialog box is created such that said subsequent preemptive modeless dialog box then becomes the active preemptive modeless dialog box.

17. The storage media according to claim 16 wherein each said active and/or subsequent preemptive modeless dialog box is managed by said intelligent worker thread, and its inputs are processed by its respective dialog box thread.

18. The storage media according to claim 16 wherein said intelligent worker thread acts on behalf of said active preemptive modeless dialog box to dispatch its inputs, as well as foreign keypushes.

19. The storage media according to claim 16 wherein said intelligent worker thread comprises:

a means for checking the message queue of said intelligent worker thread for any messages;

a means for determining if said active preemptive modeless dialog box is requested from said messages;

a means for deleting said active preemptive modeless dialog box if it exists; and a means for creating said subsequent preemptive modeless dialog box.

20. The storage media according to claim 19 further comprising:

a means for posting messages from said intelligent worker thread to said main windows thread.

21. The storage media according to claim 19 further comprising a means for terminating said intelligent worker thread if message is "QUIT".

22. The storage media according to claim 19 further comprising a means for terminating said main window thread if message is "QUIT".

23. The storage media according to claim 16 wherein said main window thread determines via a Window function whether a preemptive modeless dialog box is needed in accordance with inputs from said operator; and sends a message to said intelligent worker thread to create a preemptive modeless dialog box for a designated function.

* * * * *